(12) United States Patent
Yamasaki (10) Patent No.: US 11,498,588 B2
(45) Date of Patent: Nov. 15, 2022

(54) VEHICLE CONTROL APPARATUS

(71) Applicant: SUBARU CORPORATION, Tokyo (JP)

(72) Inventor: Motoki Yamasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 241 days.

(21) Appl. No.: 16/909,000

(22) Filed: Jun. 23, 2020

(65) Prior Publication Data

US 2021/0086796 A1 Mar. 25, 2021

(30) Foreign Application Priority Data

Sep. 25, 2019 (JP) .............................. JP2019-174716

(51) Int. Cl.
*B60W 60/00* (2020.01)
*B60W 40/09* (2012.01)
*H04W 4/44* (2018.01)
*B60W 50/14* (2020.01)

(52) U.S. Cl.
CPC ........ *B60W 60/0053* (2020.02); *B60W 40/09* (2013.01); *B60W 50/14* (2013.01); *H04W 4/44* (2018.02); *B60W 2540/225* (2020.02)

(58) Field of Classification Search
None
See application file for complete search history.

(56) References Cited

U.S. PATENT DOCUMENTS

| 8,994,492 | B2* | 3/2015 | Farhan | G05B 23/0278 |
| | | | | 455/238.1 |
| 9,619,078 | B2* | 4/2017 | Abbate | G06F 3/04817 |
| 10,395,387 | B2* | 8/2019 | Ewert | B60W 40/08 |
| 2019/0004514 | A1* | 1/2019 | Hiwatashi | B60W 30/00 |
| 2019/0276048 | A1* | 9/2019 | Suzuki | B60W 50/14 |

FOREIGN PATENT DOCUMENTS

| JP | 2017-217472 A | 12/2017 |
| JP | 2019-010929 A | 1/2019 |

* cited by examiner

*Primary Examiner* — James J Lee
*Assistant Examiner* — Shon G Foley
(74) *Attorney, Agent, or Firm* — McDermott Will & Emery LLP (57) ABSTRACT

A vehicle control apparatus is capable of switching between an automatic driving control mode and a manual driving mode. The apparatus includes a driver state monitor and a vehicle controller. The driver state monitor monitors a gaze of a driver and a state of the driver. The vehicle controller controls steering and a drive system in the automatic driving control mode. In a case that the driver state monitor detects that the driver gazes at a device that is operated by the driver as a second task when the vehicle controller requests to the driver for a takeover from the automatic driving control mode to the manual driving mode, the vehicle controller stops a function of the device.

7 Claims, 6 Drawing Sheets

VEHICLE CONTROL APPARATUS

CROSS-REFERENCE TO RELATED APPLICATIONS

The present application claims priority from Japanese Patent Application No. 2019-174716 filed on Sep. 25, 2019, the entire contents of which are hereby incorporated by reference.

BACKGROUND

The technology relates to a vehicle control apparatus capable of switching between automatic driving and manual driving of a vehicle.

In recent years, various techniques for realizing driving assist and automatic driving of a vehicle have been developed. In the driving assist of a vehicle, steering operation and/or acceleration/deceleration of the vehicle is supported while a driver holds the steering wheel. In the automatic driving of a vehicle, operations related to the driving of the vehicle are performed by recognizing traffic conditions only in a specific place even when the driver does not hold the steering wheel.

The automatic driving of the vehicle includes: a case where, even in the limited specific place, the driver responds to an emergency when a system becomes difficult to operate; a case where the system responds even in an emergency; a case where the system performs the operations related to the driving of the vehicle without limitation of the place; and the like.

Some vehicles capable of such driving assist and automatic driving are equipped with, for example, a condition measuring device that analyzes a face and a body with a camera and estimates a state of a target person as disclosed in Japanese Unexamined Patent Application Publication (JP-A) No. 2017-217472.

Also, for example, as disclosed in JP-A No. 2019-10929, there is known a driving assist device that, in order to make a driver effectively recognize a takeover from automatic driving to manual driving in advance, a system of a vehicle guides the driver to hold a steering wheel when the takeover to the manual driving is requested.

SUMMARY

An aspect of the technology provides a vehicle control apparatus capable of switching between an automatic driving control mode and a manual driving mode. The apparatus includes a driver state monitor and a vehicle controller. The driver state monitor is configured to monitor a gaze of a driver and a state of the driver. The vehicle controller is configured to control steering and a drive system in the automatic driving control mode. In a case that the driver state monitor detects that the driver gazes at a device that is operated by the driver as a second task when the vehicle controller requests to the driver for a takeover from the automatic driving control mode to the manual driving mode, the vehicle controller performs a function stop to stop a function of the device.

An aspect of the technology provides a vehicle control apparatus capable of switching between an automatic driving control mode and a manual driving mode. The apparatus includes circuitry. The circuitry is configured to monitor a gaze of a driver and a state of the driver. The circuitry is configured to control steering a drive system in the automatic driving control mode. In a case that it is detected that the driver gazes at a device that is operated by the driver as a second task when the circuitry requests to the driver for a takeover from the automatic driving control mode to the manual driving mode, the circuitry performs a function stop to stop a function of the device.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 5 is a schematic diagram illustrating a state in which functions of a car navigation and an audio system are stopped while the driver D keeps a gaze toward a car navigation screen, a front panel of the audio system, and the like.

DETAILED DESCRIPTION

In automatic driving in a limited specific place, when a system of a vehicle executes an automatic driving task, a driver may perform, for example, a smartphone operation, a navigation operation, or an audio operation as a second task (also referred to as other activity, secondary activity, or the like) which is an action other than driving while the driver does not hold a steering wheel.

That is, the second task is an action other than the driving operation of the vehicle, such as the smartphone operation, the navigation operation, the audio operation, and the like which is performed by the driver without holding the steering wheel.

Therefore, when the system of the vehicle needs to request the driver to take over from the automatic driving to the manual driving because of the own vehicle being outside an operational design domain (ODD), because of a system failure, or the like, there is a risk that the driver will be deep in the second task and the takeover to the manual driving will not be smoothly transferred.

In view of the above circumstances, it is desirable to provide a vehicle control apparatus capable of effectively requesting a takeover from the automatic driving to the manual driving even when a driver performs a second task.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. That is, in order to make each component recognizable in the drawings, the scale is different for each component, and the technology is not limited only to the number of components, the shapes of the components, the ratios of the sizes of the components, and the relative positional relationships of the components described in these drawings. Throughout the present specification and the drawings, elements having substantially the same function and configuration are denoted with the same numerals to avoid any redundant description.

Figure 1:
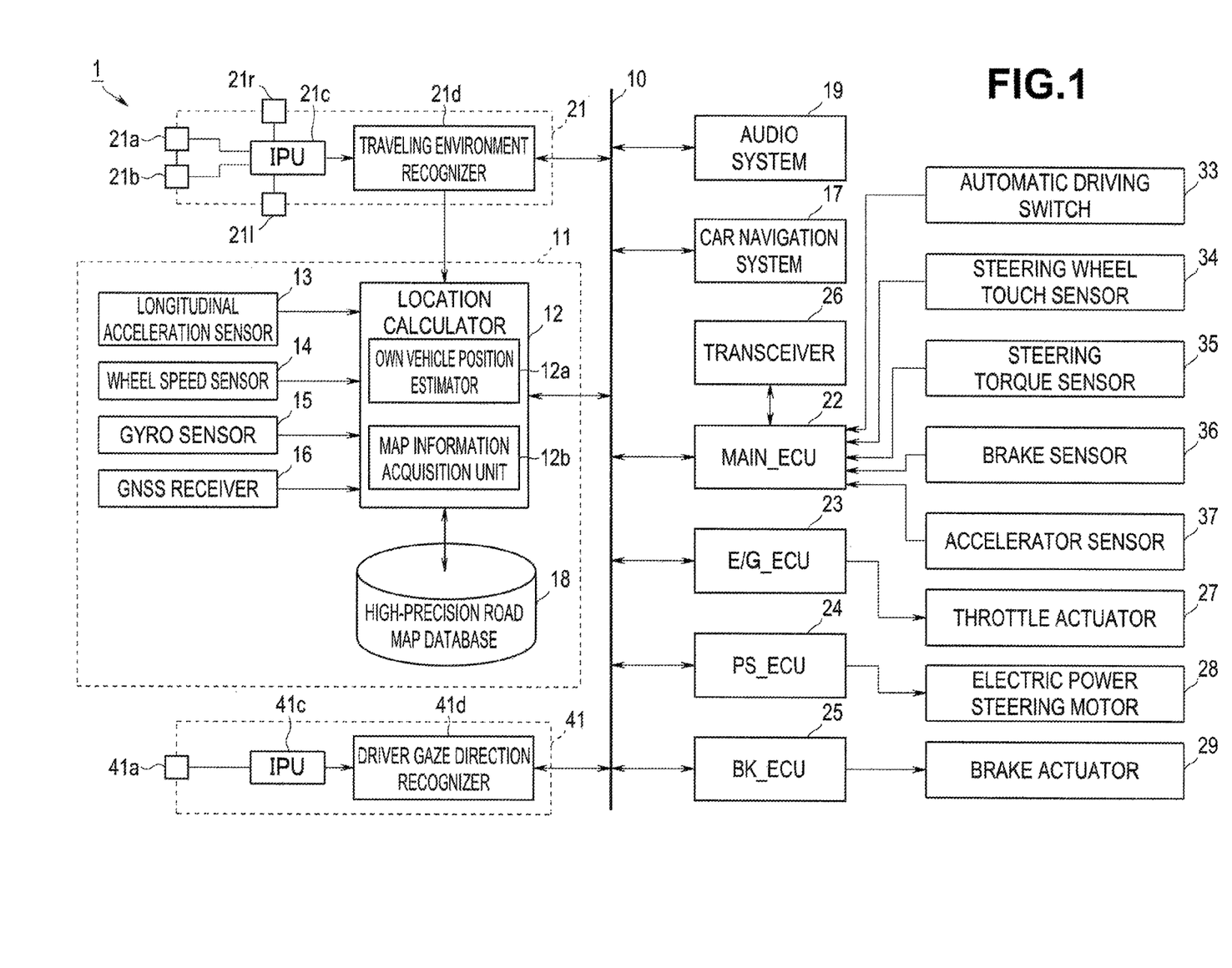
FIG. 1 is a schematic configuration diagram of a vehicle control apparatus.

A driving assist device 1 including a vehicle control apparatus according to the embodiment illustrated in FIG. 1 is mounted on a vehicle (own vehicle) such as an automobile. The driving assist device 1 includes a locator unit 11 and a camera unit 21 as sensor units (traveling environment recognizers) for recognizing a traveling environment outside the vehicle, and both the units 11 and 21 constitute a completely independent multiplex system independent of each other. Further, the driving assist device 1 includes a main control unit (hereinafter referred to as "main_ECU") 22 which is a vehicle controller of a circuit/processor, an engine control unit (hereinafter referred to as "E/G_ECU") 23, a power steering control unit (hereinafter referred to as "PS_ECU") 24, and a brake control unit (hereinafter referred to as "BK_ECU") 25, and these control units 22 to 25 are coupled together to the locator unit 11 and the camera unit 21 via an in-vehicle communication line 10 such as a CAN (Controller Area Network). In one embodiment, the driving assist device 1 may server as a "vehicle control apparatus".

In addition, a car navigation system (hereinafter referred to as a car navigation) 17 and an audio system (hereinafter referred to as an audio) 19 as second task devices are coupled to the in-vehicle communication line 10. Note that a transceiver 26 is coupled to the main_ECU 22.

Figure 2:
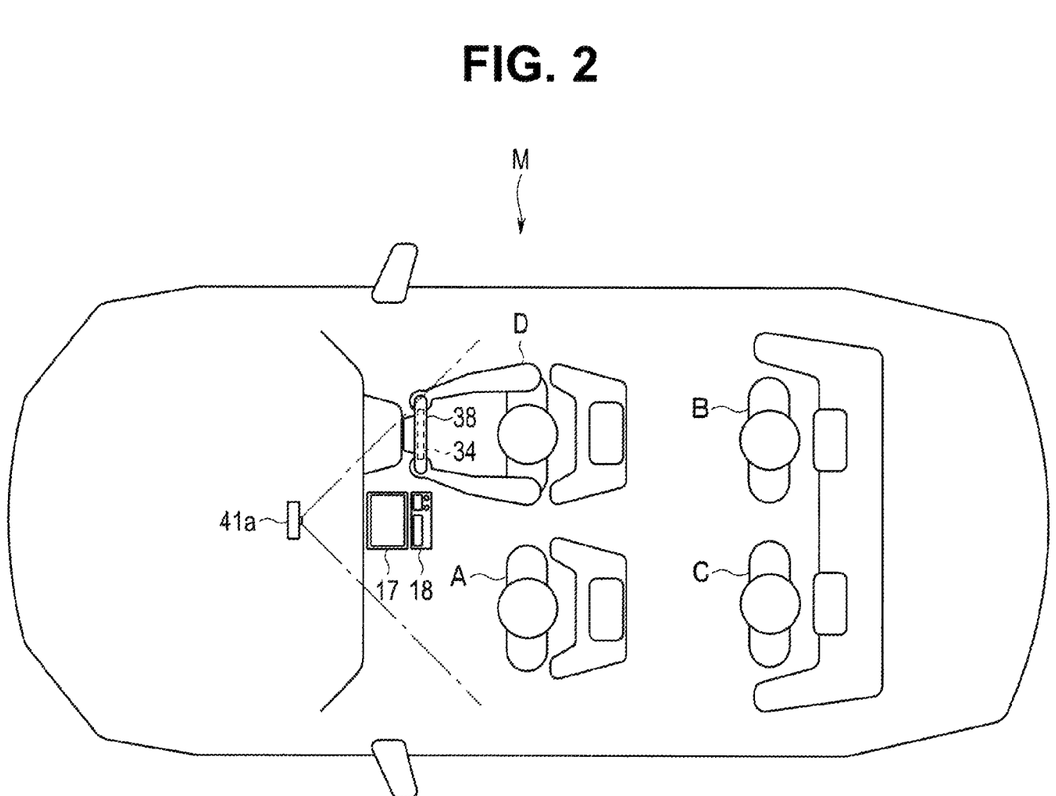
FIG. 2 is a schematic diagram of an own vehicle in which a plurality of occupants including a driver D are on board, as viewed from above.

The transceiver 26 can transmit and receive information to and from wireless communication devices that are terminals, such as mobile phones, smartphones as second task devices, and the like (here, smartphones 51 to 54 illustrated in FIGS. 5 to 7) for a plurality of occupants A to D of the own vehicle M including a driver D (see FIG. 2) by using the Bluetooth (registered trademark) system, wireless communication with a communication carrier, or the like. Note that the number of the transceivers 26 may be set corresponding to the number of occupants of the own vehicle M or the transceivers 26 are capable of multi-wireless connection (multi-channel connection).

The locator unit 11 is for estimating an own vehicle position on a road map, and has a location calculator 12 for estimating a position of the own vehicle. Sensors necessary for estimating the position of the own vehicle (own vehicle position) are coupled to an input side of the location calculator 12. The sensors include a longitudinal acceleration sensor 13 which detects longitudinal acceleration of the own vehicle, a wheel speed sensor 14 which detects rotation speeds of the front left, front right, rear left and rear right wheels, a gyro sensor 15 which detects an angular velocity or an angular acceleration of the own vehicle, a GNSS receiver 16 which receives positioning signals transmitted from a plurality of positioning satellites, and the like.

Further, a high-precision road map database 18 as a storage unit is coupled to the location calculator 12. The high-precision road map database 18 is a large-capacity storage medium such as an HDD, and stores high-precision road map information (dynamic map). The high-precision road map information has lane width data, lane center position coordinates data, lane traveling azimuth angle data, speed limit, and the like as lane data required for automatic driving. The lane data is stored every few meters for each lane on the road map.

The location calculator 12 includes an own vehicle position estimator 12a that estimates the position of the own vehicle, and a map information acquisition unit 12b. The map information acquisition unit 12b acquires route map information from a current location to a destination from the map information stored in the high-precision road map database 18, for example, based on the destination set by the driver D for the automatic driving.

Further, the map information acquisition unit 12b transmits the acquired route map information (lane data on the route map) to the own vehicle position estimator 12a. The own vehicle position estimator 12a acquires position coordinates of the own vehicle based on the positioning signals received by the GNSS receiver 16. Further, the own vehicle position estimator 12a performs map matching of the acquired position coordinates on the route map information, estimates the own vehicle position on the road map, identifies the traveling lane, and acquires the road curvature at the center of the traveling lane stored in the high-precision road map database 18.

Furthermore, in an environment in which it is impossible to receive valid positioning signals from the positioning satellites due to a decrease in sensitivity of the GNSS receiver 16, such as traveling in a tunnel, the own vehicle position estimator 12a switches to autonomous navigation in which the own vehicle position is estimated based on a vehicle speed obtained based on a wheel speed detected by the wheel speed sensor 14, an angular speed detected by the gyro sensor 15, and a longitudinal acceleration detected by the longitudinal acceleration sensor 13, and estimates the own vehicle position on the road map.

The camera unit 21 is fixed to an upper center of a front portion of a cabin, and includes an on-vehicle camera (stereo camera) configured with a main camera 21a and a sub camera 21b disposed symmetrically with respect to a center in a vehicle width direction, an image processing unit (IPU) 21c, and a traveling environment recognizer 21d.

The IPU 21c performs predetermined image processing on forward traveling environment image information ahead of the own vehicle captured by both the cameras 21a and 21b, and generates forward traveling environment image information (distance image information) including distance information obtained from a deviation amount of a corresponding target position.

Based on the distance image information and the like received from the IPU 21c, the traveling environment recognizer 21d obtains road curvatures [1/m] of lane markers that define right and left of a traveling path in which the own vehicle travels (own vehicle traveling path), and a width between the right and left lane markers (road width). Various methods are known for obtaining the road curvature and the road width. For example, the traveling environment recognizer 21d recognizes the right and left lane markers by the binarization processing according to the luminance difference based on the forward traveling environment image information, calculates the curvatures of the right and left lane markers for each predetermined section by using the curve approximation equation by the least squares method or the like, and further calculates the road width from the difference in curvatures between both the lane markers.

Then, the traveling environment recognizer 21d obtains the road curvature at the center of the lane based on the curvatures of the right and left lane markers and the lane width, and further calculates a lateral position deviation of the own vehicle with reference to the lane center, and more precisely, an own vehicle lateral position deviation Xdiff which is a distance from the lane center to the center of the own vehicle in the vehicle width direction.

In addition, the traveling environment recognizer 21d performs predetermined pattern matching or the like for the distance image information to recognize guardrails, curbs, and three dimensional objects that are present along the road. Here, in the recognition of the three dimensional object by the traveling environment recognizer 21d, recognition of, for example, the type of the three dimensional object, the distance to the three dimensional object, the speed of the three dimensional object, the relative speed between the three dimensional object and the own vehicle, and the like is performed.

Further, the camera unit 21 includes side rear cameras 21r and 21l for capturing the right and left rear sides of the own vehicle. When the side traveling environment image information of the own vehicle captured by the side rear cameras 21r and 21l is input to the IPU 21c, the IPU 21c performs a predetermined image processing such as edge detection. Further, the traveling environment recognizer 21d performs predetermined pattern matching or the like on the edge information detected by the IPU 21c, and recognizes a three dimensional object such as a parallel traveling vehicle that is on a side of the own vehicle, a following vehicle that is on a rear side of the own vehicle, or the like.

The own vehicle position estimated by the own vehicle position estimator 12a of the location calculator 12, the own vehicle lateral position deviation Xdiff and the three dimensional object information obtained by the traveling environment recognizer 21d of the camera unit 21, and the like are loaded by the main_ECU 22. Further, to an input side of the main_ECU 22, as various switches and sensors, an automatic driving switch 33 for the driver D to turn on/off the automatic driving (driving assist control), a steering wheel touch sensor 34 that is turned on when the driver D steers (holds) the steering wheel 38 (see FIG. 2), a steering torque sensor 35 that detects steering torque as a driving operation amount by the driver D, a brake sensor 36 that detects an amount of depression of a brake pedal as a driving operation amount by the driver D, and an accelerator sensor 37 that detects an amount of depression of an accelerator pedal as a driving operation amount by the driver D are coupled.

In addition, a driver monitoring system 41, which is a driver state monitor, includes a driver recognition camera 41a which is an in-vehicle camera provided in front of a driver's seat (for example, a dashboard, an instrument panel, a rearview mirror, or the like), an IPU 41c which performs image processing on an image captured by the driver recognition camera 41a, and a driver direction recognizer 41d that detects that the driver D does not gaze forward due to looking aside or dozing based on a face image of the driver D processed by the IPU 41c for each acquired image.

The driver direction recognizer 41d monitors an eye-opening state of the driver D, a gaze direction and a posture of the driver D, and the like from the acquired face image of the driver D.

In a case where the current driving mode is a second driving assist mode to be described later, the main_ECU 22 determines that the mode should be shifted to an automatic evacuation mode when system conditions are not satisfied on an assumption that the automatic driving switch 33 is maintained in an on state.

A throttle actuator 27 is coupled to an output side of the E/G_ECU 23. The throttle actuator 27 opens and closes a throttle valve of an electronically controlled throttle provided in a throttle body of an engine, and generates a desired engine output by opening and closing the throttle valve and adjusting the intake air flow rate by a drive signal from the E/G_ECU 23.

An electric power steering motor 28 is coupled to an output side of the PS_ECU 24. The electric power steering motor 28 applies steering torque to a steering mechanism by a rotational force of a motor. In the automatic driving, by controlling the electric power steering motor 28 by the drive signal from the PS_ECU 24, the active lane keep control for keeping the traveling in the current traveling lane and the lane change control for moving the own vehicle to an adjacent lane (lane change control for overtaking control or the like) are executed.

A brake actuator 29 is coupled to an output side of the BK_ECU 25. The brake actuator 29 adjusts a brake hydraulic pressure to be supplied to a brake wheel cylinder provided to each wheel. When the brake actuator 29 is driven by a drive signal from the BK_ECU 25, the brake actuator 29 causes a brake caliper that presses a brake pad against a brake wheel (not illustrated) to generate a brake force for each wheel, thereby being forced to slow down.

Incidentally, in the main_ECU 22, the manual driving mode, a first driving assist mode, the second driving assist mode, and the evacuation mode are set as the driving modes.

Here, the manual driving mode is a steering-required driving mode that requires steering by the driver D, and is a driving mode, for example, in which the own vehicle is driven in accordance with driving operations such as a steering wheel operation, an accelerator operation, a brake operation, and the like by the driver D.

Similarly, the first driving assist mode is a steering-required driving mode that requires steering by the driver D. That is, the first driving assist mode is a so-called semi-automatic driving control mode in which the own vehicle is caused to travel along the target traveling route by mainly performing the Adaptive Cruise Control, the Active Lane Keep Control, and the Lane Departure Prevention Control in combination through the control of the E/G_ECU 23, the PS_ECU 24, the BK_ECU 25, and the like, for example, while reflecting the driving operation by the driver D.

The second driving assist mode is an automatic driving control mode in which the own vehicle is caused to travel along the target traveling route by mainly performing the Adaptive Cruise Control, the Active Lane Keep Control, and the Lane Departure Prevention Control in combination through the control of the E/G_ECU 23, the PS_ECU 24, the BK_ECU 25, and the like, for example, without requiring steering, acceleration operation, and brake operation by the driver D.

The evacuation mode is a mode for automatically stopping the own vehicle in a side strip or the like in a case where, for example, while the vehicle is traveling in the second driving assist mode, the traveling in the second driving assist mode cannot be continued and the driver D cannot take over the driving operation (that is, a case where the driving mode cannot be shifted to the manual driving mode or the first driving assist mode).

Each of the driving modes set in this way is selectively switchable in the main_ECU 22, and the main_ECU 22 serves as a driving mode switching.

Here, an example of control which is executed when the driver D is requested to take over to the manual driving mode under control of the second driving assist mode where the vehicle is in the automatic driving, will be described below. Note that although the smartphone is exemplified as the wireless communication device here, the wireless communication device may be a feature phone, a PHS, a PDA, a tablet, or the like.

Figure 3:
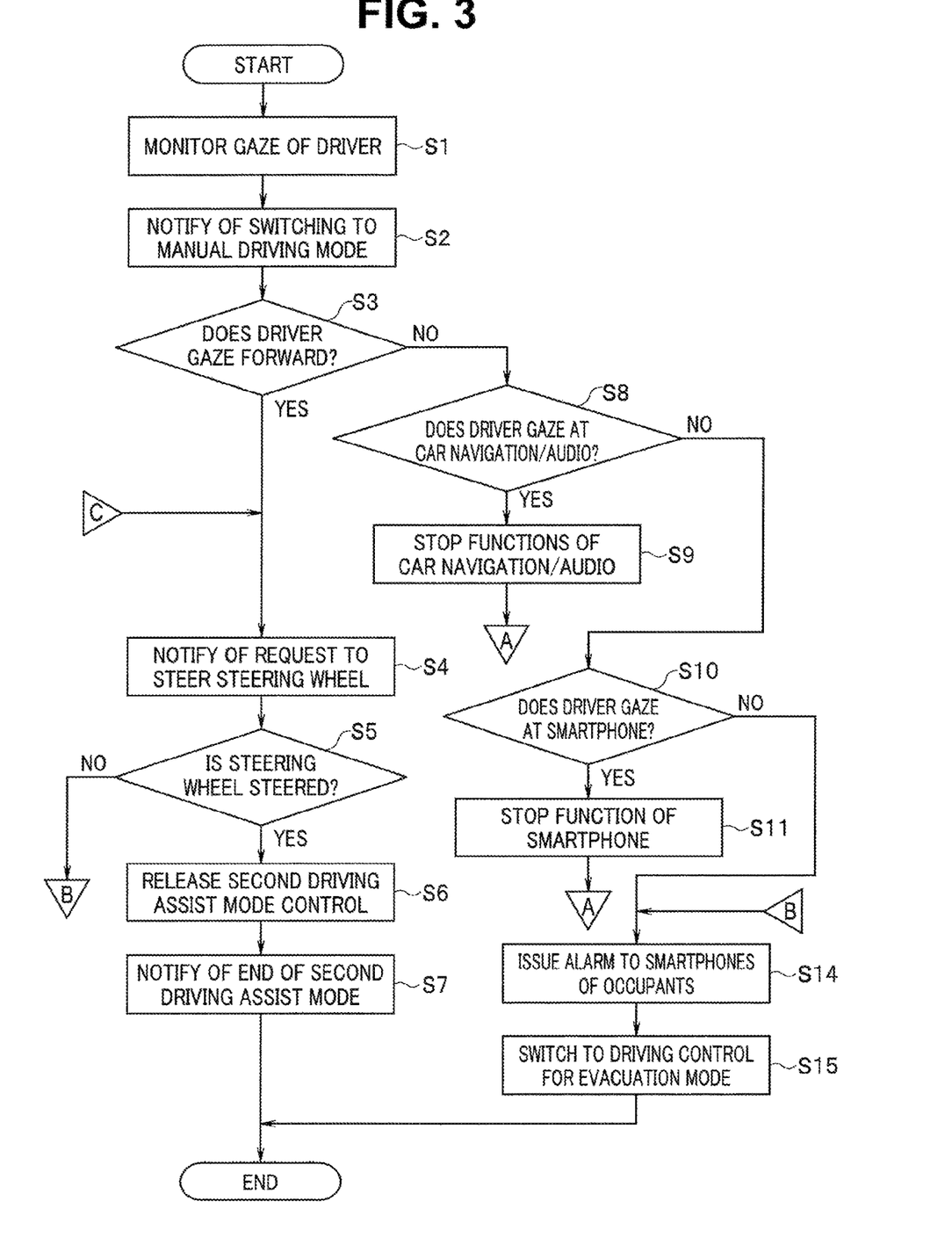
FIG. 3 is a control flowchart (part 1) executed by the vehicle control apparatus when requesting to take over from an automatic driving mode to a manual driving mode.

In the driving assist device 1, not only in the second driving assist mode, the driver direction recognizer 41d always monitors the gaze direction of the driver D based on the face image and the posture of the driver D captured by the driver recognition camera 41a (S1).

Then, in the driving assist device 1, when the own vehicle goes outside the range of the operational design domain (ODD) or when the system failure occurs, the main_ECU 22 notifies the driver D of switching from the second driving assist mode to the manual driving mode (S2). Note that the notification of switching to the manual driving mode is performed by a display on the instrument panel, a warning sound, voice, or the like.

Next, the main_ECU 22 determines whether the driver D gazes forward from the monitoring information of the driver direction recognizer 41d (S3). At this time, in a state where the driver D opens the eyes, it is determined whether the driver D does not gaze forward (looking aside, dozing, or closing the eyes even when facing the front).

When the driver D gazes forward, the main_ECU 22 notifies the driver D of a request to steer the steering wheel 38 (S4). Note that the notification here is also performed by the display on the instrument panel, the warning sound, the voice, or the like.

The main_ECU 22 determines whether the steering wheel 38 is steered by the driver D from the detection signal of the steering wheel touch sensor 34 (S5).

When the steering wheel 38 is steered by the driver D, the main_ECU 22 releases the control of the second driving assist mode (S6), and notifies of an end of the second driving assist mode (S7). Accordingly, in the driving assist device 1, the mode is switched to the manual driving mode.

Note that the notification of the end of the second driving assist mode is also performed by the display on the instrument panel, the warning sound, the voice, or the like. That is, the steering wheel touch sensor 34 is configured as a manual driving takeover judgment unit.

In step S3, when the driver D does not gaze forward, the main_ECU 22 determines whether the driver D gazes at the car navigation 17 and the audio 19 side from the monitoring information of the driver direction recognizer 41d (S8).

Figure 5:
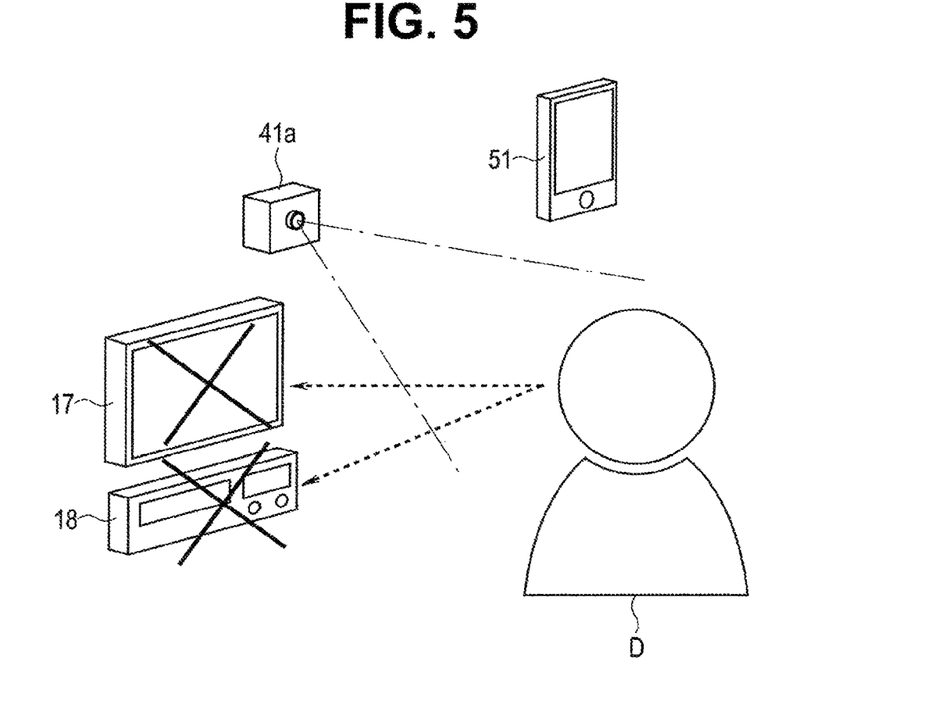

As illustrated in FIG. 5, when the driver D gazes at the car navigation 17 and the audio 19 side, the main_ECU 22 stops functions of the car navigation 17 and the audio 19 (S9).

Here, for example, a screen of the car navigation 17 is blacked out and the audio 19 is muted. In addition, an alarm may be sounded by voice or the like.

In step S8, when the driver D does not gaze at the car navigation 17 and the audio 19 side, the main_ECU 22 determines whether the driver D gazes at the smartphone 51 from the monitoring information of the driver direction recognizer 41d (S10).

Figure 6:
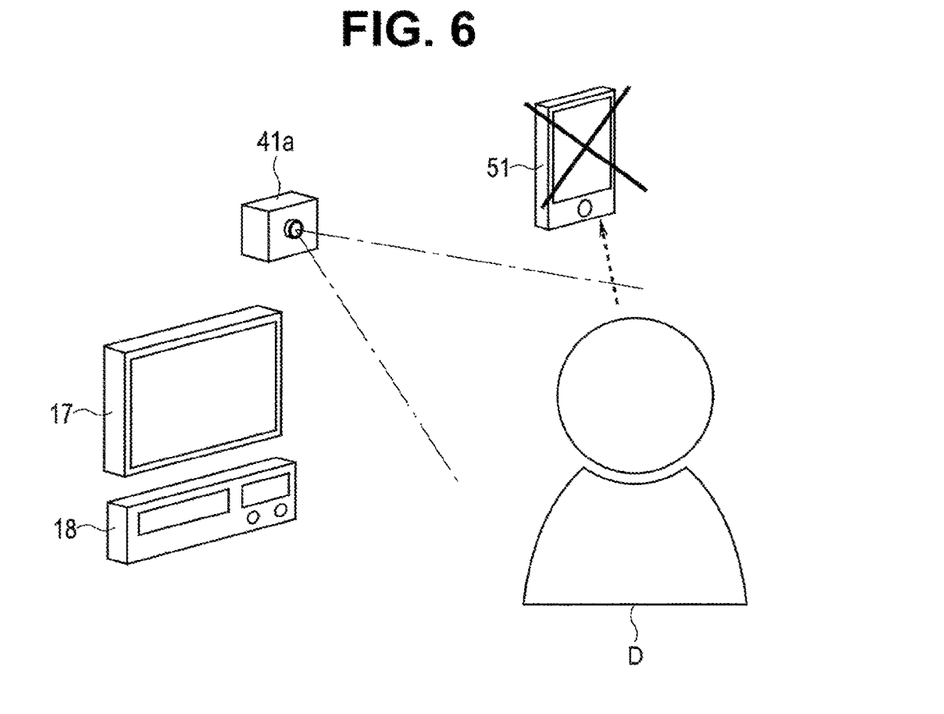
FIG. 6 is a schematic diagram illustrating a state in which a function of a smartphone is stopped while the driver D keeps a gaze toward a smartphone screen.

As illustrated in FIG. 6, when the driver D gazes at the smartphone 51, the main_ECU 22 outputs a wireless control signal from the transceiver 26 to the smartphone 51 of the driver D to stop functions of the smartphone 51 (S11).

Also here, for example, a screen of the smartphone 51 is blacked out. In addition, an alarm may be sounded by voice or the like. It is assumed that the smartphone 51 includes a dedicated application in advance and is connected to the transceiver 26 by the Bluetooth (registered trademark) system. Further, the wireless control signal for remotely controlling the smartphone 51 may be outputted by using a wireless communication line of a communication carrier.

Figure 4:
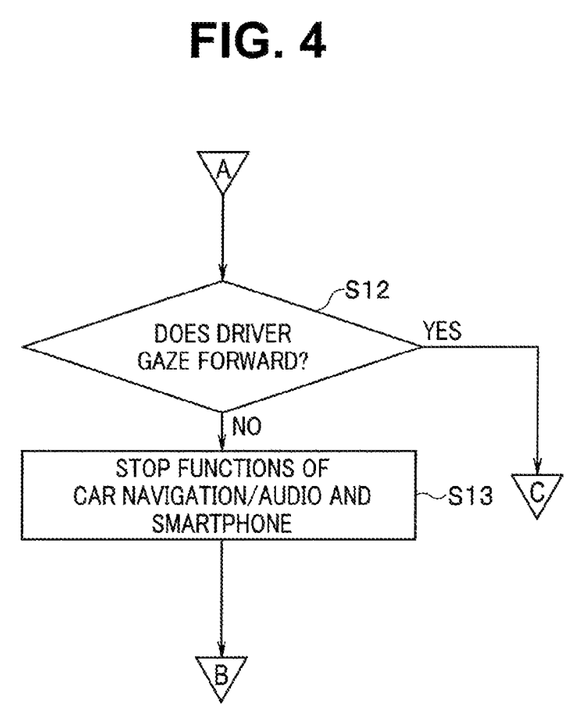
FIG. 4 is a control flowchart (part 2) executed by the vehicle control apparatus when requesting to take over from the automatic driving mode to the manual driving mode.
Figure 7:
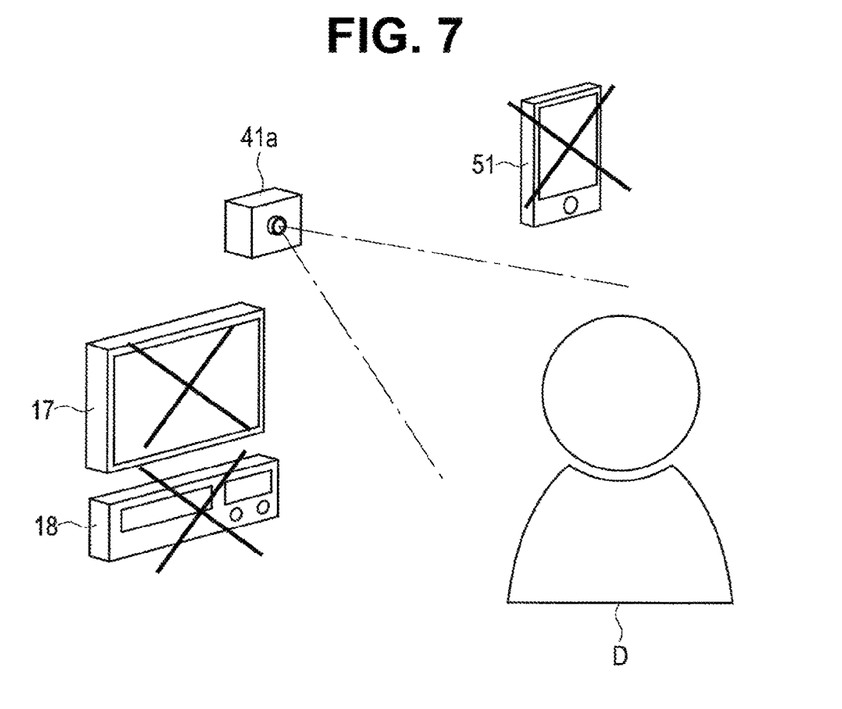
FIG. 7 is a schematic diagram illustrating a state in which the functions of the car navigation, the audio system, and the smartphone are stopped.

After the controls of step S9 and step S11 are performed, the main_ECU 22 determines again whether the driver D gazes forward as illustrated in FIG. 4 (step S12). In step S12, when the driver D does not gaze forward, as illustrated in FIG. 7, the main_ECU 22 stops all the functions of the car navigation 17, the audio 19, and the smartphone 51 used for all the second tasks (S13).

Note that, here, the function of the car navigation 17, the audio 19, or the smartphone 51 which has already been stopped remains in the stopped state.

On the other hand, when the driver D gazes forward, the main_ECU 22 executes steps S4 to S5 again. When the steering wheel 38 is steered by the driver D, the main_ECU 22 releases the function stops of the car navigation 17, the audio 19, and the smartphone 51.

Figure 8:
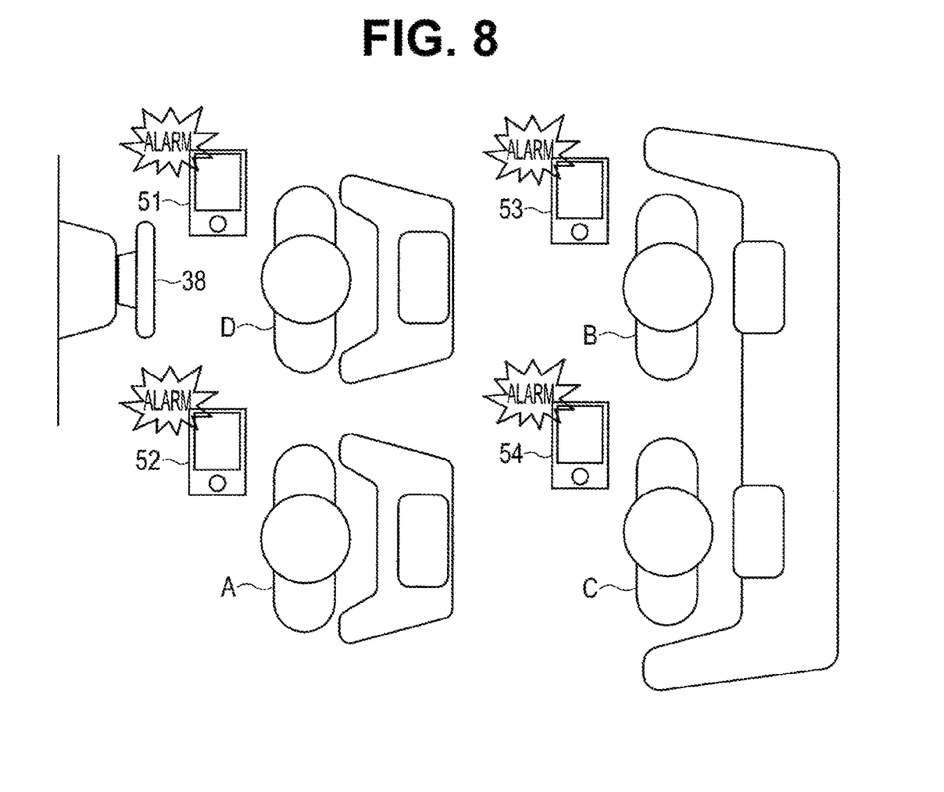
FIG. 8 is a schematic diagram illustrating a state in which alarms are notified to smartphones of occupants.

In step S10, when the driver D does not gaze at the smartphone 51, there is a high possibility of sudden illness, a doze, or the like, so the main_ECU 22 issues an alarm instruction to all of the smartphones 51 to 54 of the occupants A to D as illustrated in FIG. 8 (S14). Note that four occupants A to D including the driver D are exemplified here. As the alarm to the smartphones 51 to 54, for example, in addition to a warning by characters such as a need for driving change, a sound alarm or the like is used.

It is assumed that the smartphones 52 to 54 of occupants A to C, who are fellow passengers except for the driver D, also include the dedicated application in advance, and are connected to the transceiver 26 by the Bluetooth (registered trademark) system. Similarly to the smartphone 51 of the driver D, the wireless control signal for remotely controlling the smartphones 52 to 54 of the occupants A to C may be outputted by using the wireless communication line of the communication carrier.

Further, in step S5, when the main_ECU 22 determines that the steering wheel 38 is not steered by the driver D from the detection signal of the steering wheel touch sensor 34, the main_ECU 22 also proceeds to step S14, and executes control for issuing the alarm instruction to all of the smartphones 51 to 54 of the occupants A to D.

Then, the main_ECU 22 switches from the second driving assist mode to the evacuation mode (S15). That is, the main_ECU 22 determines that the driver D cannot take over the driving operation, and automatically stops the own vehicle M in a side strip or the like.

As described above, while the system of the vehicle executes the automatic driving task (second driving assist mode), when the driver D operates the second task, such as the operation of the car navigation 17, the audio 19, or the smartphone 51, which is an action other than the driving, without holding the steering wheel 38, the driving assist device 1 stops the function of the car navigation 17, the audio 19, or the smartphone 51 and requests the driver D to take over from the automatic driving to the manual driving quickly. Note that some functions of the device such as the car navigation 17, the audio 19, or the smartphone 51 used for the second task may be limited.

Accordingly, the driver D cannot operate the car navigation 17, the audio 19, or the smartphone 51, so that the driver D can quickly notice the takeover request from the automatic driving mode (second driving assist mode) to the manual driving mode.

As described above, the driving assist device 1 can effectively execute the request for the driver D to take over from the automatic driving to the manual driving responding to the situation of the second task by the driver D determined from the gaze (state) of the driver when taking over from the automatic driving task.

Further, even when the functions of the car navigation 17, the audio 19, or the smartphone 51 are stopped, in a situation in which the driver D cannot hold (steer) the steering wheel 38 due to sudden illness, a doze, or the like, the driving assist device 1 warns all the occupants A to D including the driver D and switches to the evacuation mode to automatically stop the own vehicle M at a safe place.

Note that, devices such as wipers and lights for operations related to the driving are excluded as devices operated by the driver D in the automatic driving mode, and the devices used as the second task not related to the driving, such as car navigation 17, the audio 19, the smartphone 51, and the like are subjected to operation restriction (function stop).

Note that the driving assist device 1 including the ECUs 22 to 25 has a processor including a central processing unit (CPU), and storage devices such as a ROM, a RAM, and the like. In addition, all or some of the plurality of circuits of the processor may be executed by software. For example, the CPU may read and execute various programs corresponding to the respective functions stored in the ROM.

Further, all or some of the functions of the processor may be constituted by a logic circuit or an analog circuit, and the processing of the various programs may be realized by an electronic circuit such as an FPGA.

Respective ECUs 22 to 25 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the respective ECUs 22 to 25 including the car navigation system 17, the audio system 19, the throttle actuator 27, the electric power steering motor 28, and the brake actuator 29. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although an embodiment of the technology has been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The technology described in the above embodiment is not limited to those described above, and various modifications may be made without departing from the gist and scope of the technology. Further, the above embodiment includes various stages of the technology, and various technologies may be extracted by appropriate combinations of a plurality of the disclosed constituent elements.

For example, even when some constituent elements are deleted from all the constituent elements illustrated in embodiment, the configuration in which the constituent elements are deleted may be extracted as a technology when the described problem can be solved and the described effect is obtained.

The invention claimed is:

1. A vehicle control apparatus that switches a driving mode of a vehicle between an automatic driving control mode and a manual driving mode, the vehicle control apparatus comprising:
    a driver state monitor configured to monitor a gaze of a driver of the vehicle and a state of the driver of the vehicle; and
    a vehicle controller configured to control steering and a drive system of the vehicle while the vehicle is in the automatic driving control mode,
    wherein while the vehicle is in the automatic driving control mode, the vehicle controller requests the driver for a takeover from the automatic driving control mode to the manual driving mode,
    wherein upon requesting the takeover from the automatic driving control mode to the manual driving mode and prior to completing the takeover from the automatic driving control mode to the manual driving mode, the vehicle controller i) determines that the driver state monitor detects the driver gazing at a device that is being operated by the driver and ii) performs a function stop to stop a function of the device,
    wherein upon performing the function stop and stopping the function of the device being operated by the driver, the vehicle controller switches the driving mode of the vehicle from the automatic driving control mode to the manual driving mode,
    wherein the vehicle control apparatus further comprises a manual driving takeover judgement unit configured to determine a completion of the takeover from the automatic driving control mode to the manual driving mode, and
    wherein in response to determining the completion of the takeover from the automatic driving control mode to the manual driving mode, the vehicle controller cancels the function stop such that the stopping of the function of the device is cancelled.

2. The vehicle control apparatus according to claim 1, wherein the manual driving takeover judgment unit determines that the takeover from the automatic driving control mode to the manual driving mode has completed based on determining that the driver has steered a steering wheel of the vehicle.

3. The vehicle control apparatus according to claim 1, wherein
    the device is a wireless communication device, and
    the vehicle control apparatus further comprises a transceiver configured to transmit a wireless control signal with which the vehicle controller remotely controls the wireless communication device.

4. The vehicle control apparatus according to claim 2, wherein
    the device is a wireless communication device, and the vehicle control apparatus further comprises a transceiver configured to transmit a wireless control signal with which the vehicle controller remotely controls the wireless communication device.

5. A vehicle control apparatus that switches a driving mode of a vehicle between an automatic driving control mode and a manual driving mode, the vehicle control apparatus comprising circuitry configured to monitor a gaze of a driver of the vehicle and a state of the driver of the vehicle; and control steering and a drive system of the vehicle while the vehicle is in the automatic driving control mode, wherein while the vehicle is in the automatic driving control mode, the circuitry requests the driver for a takeover from the automatic driving control mode to the manual driving mode, wherein upon requesting the takeover from the automatic driving control mode to the manual driving mode and prior to completing the takeover from the automatic driving control mode to the manual driving mode, the circuitry i) determines that the driver gazes at a device that is being operated by the driver, and ii) performs a function stop to stop a function of the device, wherein upon performing the function stop and stopping the function of the device being operated by the driver, the circuitry switches the driving mode of the vehicle from the automatic driving control mode to the manual driving mode, and wherein in response to the circuitry determining a completion of the takeover from the automatic driving control mode to the manual driving mode, the circuitry cancels the function stop such that the stopping of the function of the device is cancelled.

6. The vehicle control apparatus according to claim 5, wherein the circuitry determines that the takeover from the automatic driving control mode to the manual driving mode has completed based on determining that the driver has steered a steering wheel of the vehicle.

7. A vehicle control apparatus that switches a driving mode of a vehicle between an automatic driving control mode and a manual driving mode, the vehicle control apparatus comprising:

a transceiver configured to transmit and receive information to and from a wireless communication device; and circuitry configured to:

monitor a gaze of a driver of the vehicle; and control steering and a drive system of the vehicle while the vehicle is in the automatic driving control mode;

notify the driver of switching of the driving mode to the manual driving mode from the automatic driving control mode while the vehicle is in the automatic driving control mode;

perform a first determination to determine whether the driver gazes forward after notifying the switching;

in response to determining in the first determination that the driver gazes forward, perform the switching;

in response to determining in the first determination that the driver does not gaze forward, perform a second determination to determine whether the driver gazes at the wireless communication device;

in response to determining in the second determination that the driver gazes at the wireless communication device, transmit a first control information via the transceiver to the wireless communication device, the first control information including a command to the wireless communication device to stop a function of the wireless communication device;

perform a third determination to determine whether the driver gazes forward after transmitting the first control information;

in response to determining in the third determination that the driver gazes forward, i) perform the switching and ii) transmit a second control information via the transceiver to the wireless communication device based on a completion of a takeover from the automatic driving control mode to the manual driving mode, the second control information including a command to the wireless communication device to restart the function of the wireless communication device;

in response to determining in the third determination that the driver does not gaze forward, i) abort the switching and ii) transmit a third control information via the transceiver to the wireless communication device, the third control information including a command to the wireless communication device to output an alarm; and in response to determining in the second determination that the driver does not gaze at the wireless communication device, i) abort the switching and ii) transmit the third control information via the transceiver to the wireless communication device.

* * * * *